March 2, 1971 A. R. HUTSON ET AL 3,567,373

LOW DONOR CONCENTRATION ZINC OXIDE AND DEVICES UTILIZING SAME

Filed Nov. 29, 1967 2 Sheets-Sheet 1

INVENTORS A. R. HUTSON
R. A. LAUDISE
BY George S. Indig
ATTORNEY

LOW DONOR CONCENTRATION ZINC OXIDE AND DEVICES UTILIZING SAME

Filed Nov. 29, 1967 2 Sheets-Sheet 2

United States Patent Office 3,567,373

Patented Mar. 2, 1971

3,567,373

LOW DONOR CONCENTRATION ZINC OXIDE AND DEVICES UTILIZING SAME

Andrew R. Hutson, Summit, and Robert A. Laudise, Berkeley Heights, N.J., assignors to Bell Telephone Laboratories, Incorporated, Murray Hill, N.J.

Filed Nov. 29, 1967, Ser. No. 686,405

Int. Cl. C01g *9/02*

U.S. Cl. 23—147 5 Claims

ABSTRACT OF THE DISCLOSURE

Effective operation of acoustoelectric devices such as amplifiers, oscillators, circulators, isolators and switches requires high resistivity substantially uncompensated material. Uncompensated zinc oxide, otherwise considered the best material for such devices, has been unsuitable by reason of its large donor concentration. Substantially uncompensated material may now be prepared by a technique involving introduction of (1) lithium during hydrothermal growth, (2) replacement of lithium by zinc by heating in zinc vapor; and (3) out-diffusion of interstitial zinc by baking in oxygen.

BACKGROUND OF THE INVENTION (1) Field of the invention

This invention relates to a method for obtaining low donor concentration substantially uncompensated zinc oxide crystals and to the resulting crystals and to devices utilizing such crystals.

(2) Description of the prior art

Zinc oxide crystals are of interest for their semiconducting properties and piezoelectric properties. More specifically, zinc oxide has a high electromechanical coupling coefficient and good chemical and physical stability, making it desirable for use in various piezoelectric devices. In addition, its exhibition of semiconducting properties as well as piezoelectric properties enables its use in elastic wave devices such as amplifiers. The simultaneous presence of these properties results in the possibility of interaction of electron space charge waves and elastic waves.

These devices set severe standards for the chemical control of donor and acceptor impurities. At their operating frequency the Debye screening length of the charge carriers should be approximately equal to the acoustic wavelength. For a zinc oxide shear wave device, most efficient operation at a frequency of 1 gigahertz requires a carrier concentration of the order of $10^{14}$ per cubic centimeter, and for other frequencies the desired carrier concentration is proportional to the square root of the frequency.

Unfortunately, as grown crystals of zinc oxide exhibit carrier concentrations of the order of from $10^{16}$ to $10^{17}$ per cubic centimeter, which is sufficiently high to make operation even at frequencies as low as the terihertz range impractical. The usual method for increasing the resisistivity of zinc oxide crystals is to compensate donors as, for example, by lithium diffusion and oxygen baking.

This compensation unfortunately is difficult to achieve to a prescribed carrier concentration in the range of interest in a uniform and reproducible manner. Additionally, this compensation substantially destroys the proper interaction of the space charge waves and elastic waves.

The present invention is essentially a method for producing high resistivity substantially uncompensated zinc oxide crystals which are particularly suitable for use in the devices already mentioned, but are also significant in that they contain substantially uncompensated carriers in a concentration which may be two orders of magnitude lower than has heretofore been obtainable.

SUMMARY OF THE INVENTION

This invention is essentially a method for substantially uncompensated zinc oxide having a carrier concentration of the order of $10^{15}$ per cubic centimeter or lower. The method consists of (1) growing zinc oxide crystals in a hydrothermal solution containing lithium ions; (2) heating the resulting crystals in an atmosphere containing zinc vapor; (3) such heating followed by baking of the crystals in an atmosphere containing oxygen.

Such crystals are suitable for use in various elastic wave devices such as amplifiers, oscillators, circulators, isolators and switches, and such devices including crystalline material as grown herein constitute a part of the invention.

DETAILED DESCRIPTION OF THE INVENTION

Figure 1:
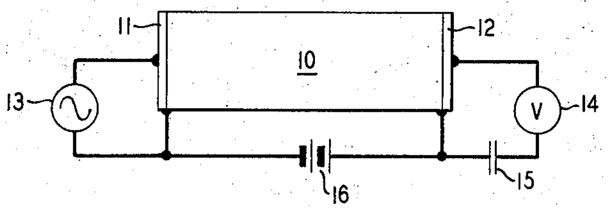
FIG. 1 is a schematic view of an elastic wave amplifier constructed according to the teachings of this invention.

The inventive method relies upon the hydrothermal growth technique for the production of the zinc oxide crystals because this growth technique is presently the most suitable way to produce such crystals of sufficient size and quality for use in various devices. However, successful utilization of this growth technique requires the introduction of lithium ions in the aqueous solution. Such ions become the donors in the resulting crystals which give rise to low resistivities and thus must be either compensated or removed for use in devices of the type discussed. For reasons already stated compensation is undesirable. Thus, these ions must be removed. In accordance with the invention, removal is accomplished by the two-step process of heating the crystals in zinc vapor in order to out-diffuse lithium and introduce zinc which exchanges position with any substitutional lithium and prevents further lithium substitution, followed by baking in oxygen in order to reduce the amount of interstitial zinc.

HYDROTHERMAL GROWTH TECHNIQUE

As is known, the apparatus is basically a pressure-temperature bomb. While not essential to this description, further details may be obtained from U.S. Pat. 3,201,209, issued to Caporaso et al. on Aug. 17, 1965, U.S. Pat. 3,271,114, issued to Kolb on Sept. 6, 1966, and from R. R. Monchamp, "Growth of Zinc Oxide Crystals—Interim Engineering Progress Report," Airtron Division of Litton Industries, Morris Plains, N.J. ASD Project Nr. 7–988, Contract No. AF33 (657)–8795, November 1964.

In the interior portion of the autoclave, growth seeds are suspended in the top portion and the nutrient mass is situated in the bottom. Separating these two regions is a baffle which serves to maintain a temperature differential between the growth region and the nutrient region while permitting flow of zinc oxide-rich solution to the growth region. The hydrothermal solution which fills the interior portion of the autoclave consists of a solution of 2 to 8 molal alkali or alkaline metal hydroxide and a lithium ion concentration of .1 to 4 molal. Appropriate compounds are sodium hydroxide, potassium hydroxide, cesium hydroxide, rubidium hydroxide, strontium hydroxide, barium hydroxide and mixtures thereof. Suggested lithium salts are lithium acetate, lithium tetraborate, lithium citrate, lithium formate, lithium hydroxide, lithium nitrate, lithium oxylate, lithium sulfate and the halide salts.

It is postulated that the lithium ions supply a needed conduction mechanism during growth. The presence of the hydroxide is necessary to induce sufficient solubility of the zinc oxide. Since the solubility of the zinc oxide decreases with decreasing temperature, the thermal gradient between the seed crystal and the nutrient mass permits such transport to occur and causes the zinc oxide to precipitate from solution on the seed crystal. Thus it is essential to maintain a temperature differential between the regions adjacent the nutrient and the solution in the area of crystallization. Too small a differential results in an impractically low growth rate. As the differential is increased the growth rate increases but eventually spontaneous nucleation becomes troublesome and the crystals begin to show flaws. Excessive growth rates also tend to cause dendritic growth.

To obtain a practical growth rate it is necessary to fill the autoclave to at least 60 percent of its total volume at room temperature. As the degree of fill is increased, the growth rate increases. It is generally convenient to operate in the range of 70 to 90 percent.

Practical growth rates and good quality crystals are found to obtain from the use of temperature differentials between the seed and nutrient areas in the range of 5 to 100° C. The seed is maintained at a constant temperature between 300° C. and 500° C., below which growth rates are impractically slow and above which, excessive pressures are generated using the previously described degree of fill.

EXCHANGE REACTION AND OUT-DIFFUSION

The reason for the introduction of lithium during the hydrothermal growth just described stems from the necessity of carrier concentrations of at least $10^{16}$ per cubic centimeter to allow proper growth while suppressing the inclusion of non-removable donors such as oxygen vacancies to concentrations below $10^{14}$ per cubic centimeter. These lithium ions must now be removed. Removal of the lithium is accomplished by a two-step process which comprises exchanging lithium with zinc by heating the crystals in zinc vapor and then out-diffusing the interstitial zinc by baking the crystals in an atmosphere containing at least 10% oxygen, remainder substantially inert gases. Interstitial lithium easily diffuses out during heating. (The zinc vapor results in exchange of zinc for any already substituted lithium and in prevention of further lithium substitution.) Prior attempts to out-diffuse lithium directly by baking in oxygen resulted in retention of lithium and in highly compensated zinc oxide.

Because of the desirability of having the lowest possible impurity level in the zinc oxide crystal, it is an inherent advantage of this method that the exchange reaction and out-diffusion are accomplished by means of contacting the surface of the crystal only with materials of which the as-grown crystal is comprised. Accordingly, a further advantage may be realized by repeating the step of heating in zinc prior to the oxygen bake. This procedure permits removal of lithium which has accumulated at the crystal surface (which may be accomplished by etching the surface of the crystal) and in the vapor itself. Thus, any unfavorable shifts in equilibrium in the exchange reaction due to the presence of accumulated lithium is obviated.

Impurity content is not of particular concern at any stage during processing. The zinc diffusion and oxygen baking are both carried out under such mild conditions that the harmful impurities are excluded.

The times and temperatures of treatments to effect both the exchange reaction and out-diffusion of zinc are dictated by the diffusion rate of interstitial zinc into or out of the sample. A minimum treatment temperature of 500° C. during both zinc and oxygen treatment is dictated by the excessive times required for lower temperature. The minimum time necessary to achieve a noticeable reduction in the lithium concentration at a temperature of 500° C. may be derived from the diffusion constant of interstitial zinc in zinc oxide at this temperature.

A diffusion of zinc into the sample in an amount equivalent to about 50% of its saturated concentration is sufficient for a noticeable improvement. For a sample in the form of a rectangular slab, the fraction in or out of zinc atoms between surfaces, both of which are concentrated with zinc, is given by the following expression:

$$\left[1-\frac{8}{\pi^2}\sum_{m=0}^{\infty}\frac{1}{(2m+1)^2}\cdot\exp\left\{\frac{-D(2m+1)^2\pi^2 t}{l^2}\right\}\right]$$

where D is the diffusion constant of zinc, $t$ is the time allowed for diffusion, $l$ is the distance between boundaries in the slab.

This expression may be found in R. M. Barrer, Diffusion in the Through Solids, Cambridge, 1951. The diffusion constant of zinc in zinc oxide varies exponentially with temperature, as seen from Journal of Physics and Chemistry of Solids, volume 3, page 233, 1957, and has a value of $8\times10^{-8}$ cm.$^2$/sec. at a temperature of 500° C. We may approximate the condition for 50% completion of diffusion by setting the expression to ½ and taking only the term $m=0$. Assuming a slab thickness of one millimeter, the time required for 50% diffusion becomes 100 minutes. For other slab thicknesses, the time at 500° C. is proportional to the square of the thickness.

The maximum temperature of treatment for both the exchange reaction and for the out-diffusion of zinc is 1000° C., above which the stability of the crystal is threatened and the oxidizing influence of oxygen becomes weak. Those skilled in the art will, however, be aware of the possibility of a precipitation of zinc in the crystal, if cooled too rapidly from higher temperatures after the exchange reaction, for some zinc concentrations and pressures. It is, of course, advantageous to carry out these reactions at high temperatures in that the reaction rates are accordingly increased.

For optimum results, it is desirable to treat the samples substantially longer than the minimum time specified or at higher temperature. A preferred limit is from four hours per millimeter thickness at a temperature of 500° C. to 10 minutes at a temperature of 1000° C. It is particularly important in the case of out-diffusion to treat for longer periods of time in order to arrive at a condition of substantial homogeneity. Preferred limits during oxygen treatment are three times as great as the preferred time for zinc treatment.

A further advantage depending on intended device use may be gained by compensating the crystals after treatment. This would, of course, result in a crystal which not only has a lower total donor concentration than is otherwise obtainable but also has a very high resistivity due to the effect of the compensation. Such a treatment is to be considered as encompassed within the scope of this invention.

EXAMPLE

A crystal obtained by the growth technique described above was heated in zinc vapor at about 750° C. for four hours, followed by baking in air at about the same temperature for 17 hours. This sample showed a room temperature carrier concentration of $5\times10^{14}$ per cubic centimeter with no apparent compensation.

DEVICES

As has already been stated, low donor concentration substantially uncompensated zinc oxide is particularly useful in devices which take advantage of the interaction of the crystals' semiconductor and piezoelectric properties. The characteristics of these devices may better be understood when considered in conjunction with the drawings:

FIG. 1 shows a typical construction of an acoustic wave amplifier. To the ends of body 10, comprising a material of the invention, are affixed ultrasonic transducers 11 and 12. The transducers are of the type generally used in the art. An A.C. signal generated at 13 is impressed across transducer 11, thus creating an acoustic signal which is transmitted through the medium 10 into transducer 12. The output signal across transducer 12 generated by the acoustic signal is received by the voltmeter 14 through blocking capacitor 15. The D.C. field which couples with the piezoelectric field generated by the acoustic signal is impressed across medium 10, as shown, by source 16.

Figure 2A:
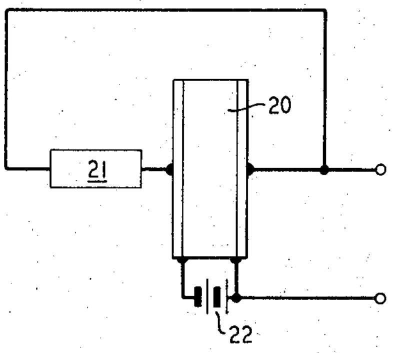
FIG. 2A is a schematic view of an oscillator utilizing the principles of this invention.
Figure 2B:
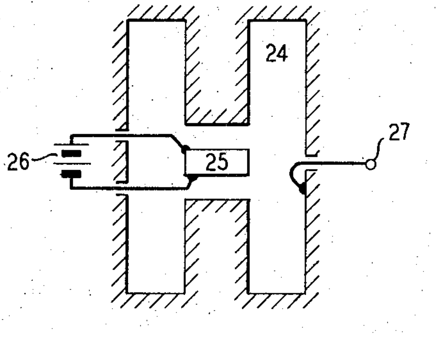
FIG. 2B is a schematic view of another embodiment of an oscillator utilizing a resonant cavity.

FIGS. 2A and 2B illustrate two forms of oscillators. In the device of FIG. 2A an electromagnetic signal is amplified in amplifier 20, which is essentially identical to the amplifier of FIG. 1. The output is then sent back to the input by the feedback circuit shown, which includes reactance 21. The oscillator is tuned with reactance 21 and the D.C. source 22.

FIG. 2B shows an oscillator composed of an amplifier mounted in a resonant cavity 24. The amplifier consists of a body 25 of the material of the invention with a D.C. field impressed across it by D.C. source 26 in the direction of propagation of resonant waves through the body. The cavity oscillations are enhanced by the amplification of the resonant frequency through interaction of the D.C. field in the acoustic medium. A resonant wave appears at output 27.

Figure 3:
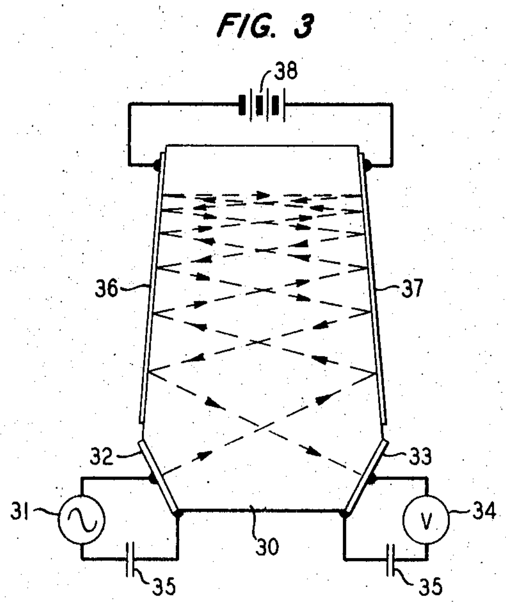
FIG. 3 is a schematic view of an ultrasonic delay line which may simultaneously exhibit gain.

FIG. 3 illustrates a typical ultrasonic delay line. The delay medium 30 composed of a material of the invention is similar to those conventionally employed in the art. An electromagnetic signal generated at 31 is fed across transducer 32. The resulting acoustic signal enters the delay medium 30 and traverses a path essentially as shown and emerges through transducer 33. The transducer 33 converts the acoustic signal back to electromagnetic energy which is indicated by voltmeter 34. Capacitors 35 block the D.C. current. Electrodes 36 and 37 bound each reflecting surface of the delay medium and bias source 38 impresses a D.C. field between these electrodes.

Figure 4:
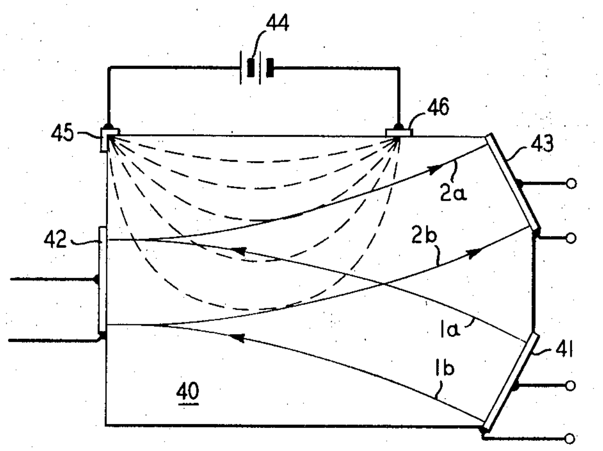
FIG. 4 is a schematic view of an elastic wave circulator operating according to the teachings of this invention.

FIG. 4 shows a circulator. This device generally involves the separation of transmitted signals from signals being received where both share the same transmission medium. The piezoelectric semiconductor medium 40 includes three ultrasonic transducers 41, 42, and 43 disposed as shown. It functions to maintain the separation between a signal injected at transducer 41 to be transmitted through the medium to transducer 42 from a signal received at transducer 43. This effect is achieved due to field established in the medium 40 by D.C. source 44 and electrodes 45 and 46. This field provides a diminishing intensity from one side of the medium 40 to the other as shown. Thus, the velocity of sound in medium 40 depends upon the electric field intensity. The nonuniform field causes the waves to refract. Accordingly, a wave indicated by rays 1A and 1B injected at transducer 41 is bent toward transducer 42. However, a wave indicated by 2A and 2B injected at 42 is influenced by a field of opposite direction and is bent toward the transducer 43.

Figure 5:
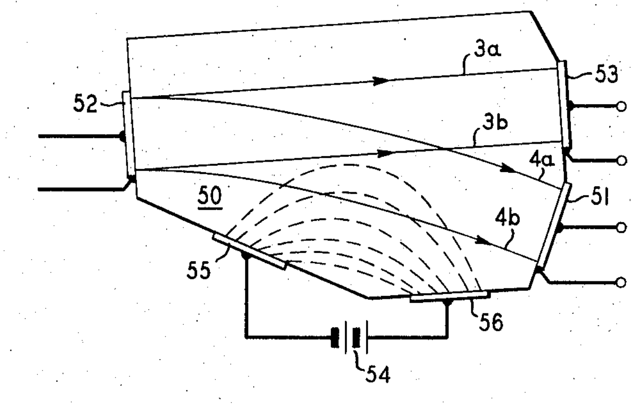
FIG. 5 is a schematic view of an elastic wave switch similar in construction and operation to the device of FIG. 4.

FIG. 5 shows a switching device. It is similar to the device of FIG. 4. Body 50 composed of a material of the invention carries three piezoelectric transducers 51, 52, and 53 disposed as shown. The transducer 53 is essentially opposite to the transducer 52. D.C. source 54 and electrodes 55 and 56 establish the desired field and an acoustic signal generated at transducer 52 normally travels the path indicated by rays 3A and 3B and is received at transducer 53. However, upon application of the D.C. field at 54, the wave is refracted and assumes a direction corresponding to rays 4A and 4B and is received at transducer 51.

Each of these devices utilizes the interaction of acoustic and electric energy as already described. When the drift velocity of the free carriers induced by the application of the D.C. field is greater than, and in the same direction as, the acoustic wave propagation, then energy is transferred to the acoustic wave and amplification occurs. Under all other conditions, energy is subtracted from the acoustic wave and attenuation occurs.

A more complete description of the operation of these devices may be found in Pat. Re. 26,091 to D. L. White on Sept. 20, 1966.

The invention has been dscribed in terms of a limited number of exemplary embodiments. It is evident, however, from the material characteristics set forth, that these embodiments in no way form an exhaustive listing. For example, if the conductivity of the material is reduced by compensation to $10^{-8}$ per ohm per cm. or lower, it is then suitable for use in devices such as hydrophones, sonar devices, delay lines, transducers and other ultrasonic generators and detectors.

What is claimed is:

1. Method comprising growing a zinc oxide crystal hydrothermally in a nutrient containing lithium ions whereby lithium ions are introduced, heating the resulting crystal in zinc vapor at a temperature of from 500° C. to 1000° C. for a time of at least 100 minutes at 500° C. with time decreasing exponentially with higher temperatures, such that zinc is introduced both interstitially and substitutionally into the crystalline lattice and heating the said crystal in oxygen at a temperature of from 500° C. to 1000° C. for a time of at least 100 minutes at 500° C. with time decreasing exponentially with higher temperatures, to out-diffuse interstitial ions.

2. The method of claim 1 in which heating in zinc vapor is carried out at from 500° C. for 4 hours to 1000° C. for 10 minutes.

3. The method of claim 1 in which heating in oxygen is carried out at from 500° C. for 12 hours to 1000° C. for 30 minutes.

4. The method of claim 1 in which said nutrient contains lithium ions and a metal hydroxide selected from the group consisting of an alkali metal hydroxide, strontium hydroxide and barium hydroxide and mixtures thereof, the lithium ions and the metal hydroxide having concentrations of .1 to 4 molal and 2 to 8 molal, respectively, at a temperature of at least 300° C. at a pressure of at least 3200 pounds per square inch while maintaining a temperature difference between said seed and said nutrient mass of from 5 to 100° C. without the nutrient hotter than the seed.

5. The product produced by the method of claim 1.

References Cited

UNITED STATES PATENTS 3,201,209 8/1965 Caporaso et al. ______ 23—147X

OTHER REFERENCES

Pohl, "Chemical Abstracts," vol. 53, 1959, p. 15777, 23—148.

Pohl, "Z. Physik," vol. 155, 1959, pp. 120–128, 23—148.

Shabrova et al., "Chemical Abstracts," vol. 65, 1966, pp. 13179–13180, 23—147.

HERBERT T. CARTER, Primary Examiner

U.S. Cl. X.R.

23—148, 293